United States Patent
Sangiovanni

(10) Patent No.: US 11,865,894 B2
(45) Date of Patent: Jan. 9, 2024

(54) INTERNAL HEAT EXCHANGER FOR A VEHICULAR AIR CONDITIONING SYSTEM

(71) Applicant: SUMITOMO RIKO COMPANY LIMITED, Aichi (JP)

(72) Inventor: Matteo Sangiovanni, Chivasso (IT)

(73) Assignee: SUMITOMO RIKO COMPANY LIMITED, Aichi (JP)

(*) Notice: Subject to any disclaimer, the term of this patent is extended or adjusted under 35 U.S.C. 154(b) by 391 days.

(21) Appl. No.: 17/143,710

(22) Filed: Jan. 7, 2021

(65) Prior Publication Data

US 2021/0129621 A1     May 6, 2021

Related U.S. Application Data

(63) Continuation of application No. PCT/IB2019/059365, filed on Oct. 31, 2019.

(30) Foreign Application Priority Data

Nov. 2, 2018 (IT) ........................ 102018000010006

(51) Int. Cl.
    *B60H 1/00*       (2006.01)
    *F28F 7/02*       (2006.01)
    *F28D 21/00*      (2006.01)
    *F28F 9/00*       (2006.01)

(52) U.S. Cl.
    CPC .......... *B60H 1/00342* (2013.01); *F28F 7/02* (2013.01); *F28D 2021/008* (2013.01); *F28D 2021/0068* (2013.01); *F28F 9/005* (2013.01); *F28F 2230/00* (2013.01)

(58) Field of Classification Search
    CPC ......... B60H 1/00342; F28D 2021/0068; F28D 2021/008; F28F 7/02; F28F 9/005; F28F 2230/00
    See application file for complete search history.

(56) References Cited

U.S. PATENT DOCUMENTS

2,821,369 A * 1/1958 Hilliard ................. F28F 7/02
                                                          165/145
2,887,304 A * 5/1959 Hilliard ................. F28F 7/02
                                                          165/905

(Continued)

FOREIGN PATENT DOCUMENTS

AU       2016325427 A1 * 3/2018 .............. B22F 10/00
DE     10 2012 017404     3/2014

(Continued)

*Primary Examiner* — Ljiljana V. Ciric
(74) *Attorney, Agent, or Firm* — Leason Ellis LLP

(57) ABSTRACT

An internal heat exchanger for an air conditioning system of a vehicle having an intermediate portion and two end portions, each of the end portions includes a first opening for the passage of a first conditioning fluid inside the internal heat exchanger and a second opening for the passage of a second conditioning fluid inside the heat exchanger. The intermediate portion is hollow, defines an inner volume, and includes inner conduits housed inside the inner volume extending between the end portions. The first openings are fluidically connected via respective connecting conduits to each of the inner conduits and the second openings are fluidically connected to the inner volume via an individual conduit.

13 Claims, 6 Drawing Sheets

(56) References Cited

U.S. PATENT DOCUMENTS

| | | | | |
|---|---|---|---|---|
| 3,250,322 A * | 5/1966 | McCrary, Jr. | C04B 41/87 | 165/164 |
| 3,391,016 A * | 7/1968 | McCrary, Jr. | C04B 41/009 | 427/249.15 |
| 4,044,825 A * | 8/1977 | Gugenberger | F28F 21/02 | 165/DIG. 396 |
| 4,343,354 A * | 8/1982 | Weber | F28F 7/02 | 165/DIG. 395 |
| 6,383,422 B1 * | 5/2002 | Hoffschmidt | B01J 19/32 | 264/DIG. 48 |
| 6,888,720 B2 * | 5/2005 | Pfister | H01L 23/3733 | 361/689 |
| 7,687,132 B1 * | 3/2010 | Gross | B22F 3/002 | 428/116 |
| 8,573,289 B1 * | 11/2013 | Roper | F28D 7/0066 | 165/173 |
| 9,086,229 B1 * | 7/2015 | Roper | G02B 5/08 | |
| 9,453,604 B1 * | 9/2016 | Maloney | B29C 33/40 | |
| 9,527,261 B1 * | 12/2016 | Roper | E04C 3/28 | |
| 9,758,382 B1 * | 9/2017 | Roper | C04B 38/0615 | |
| 9,862,151 B1 * | 1/2018 | Maloney | B32B 3/26 | |
| 9,976,815 B1 * | 5/2018 | Roper | F28D 7/08 | |
| 10,107,555 B1 * | 10/2018 | Miller | B23P 15/26 | |
| 10,493,693 B1 * | 12/2019 | Robinson | B33Y 80/00 | |
| 10,513,056 B1 * | 12/2019 | Roper | B29C 33/40 | |
| 10,527,359 B1 * | 1/2020 | Roper | H05K 7/20336 | |
| 10,955,200 B2 * | 3/2021 | Sabo | B23P 15/26 | |
| 10,995,996 B2 * | 5/2021 | Erno | F28F 9/02 | |
| 11,079,186 B2 * | 8/2021 | Walter | F28F 7/02 | |
| 11,248,854 B2 * | 2/2022 | Greiciunas | F28F 3/086 | |
| 11,280,554 B2 * | 3/2022 | Horoszczak | F28F 7/02 | |
| 11,592,243 B2 * | 2/2023 | Greiciunas | B33Y 80/00 | |
| 11,596,820 B2 * | 3/2023 | Cockerham | B33Y 80/00 | |
| 2002/0084059 A1 * | 7/2002 | Rittberger | F28F 9/026 | 165/166 |
| 2009/0101313 A1 * | 4/2009 | Hofmann | F28F 3/12 | 165/104.19 |
| 2009/0126911 A1 * | 5/2009 | Shore | F28D 1/0325 | 165/166 |
| 2009/0274549 A1 * | 11/2009 | Mitchell | F01D 5/186 | 415/115 |
| 2010/0139900 A1 * | 6/2010 | Thompson | F28D 9/0043 | 165/166 |
| 2013/0206374 A1 * | 8/2013 | Roisin | F28D 7/0041 | 165/165 |
| 2013/0264031 A1 * | 10/2013 | Plourde | F28F 1/022 | 165/104.11 |
| 2014/0251585 A1 * | 9/2014 | Kusuda | F28D 1/0226 | 165/164 |
| 2019/0021186 A1 * | 1/2019 | Poltorak | H05K 7/20172 | |
| 2019/0033013 A1 * | 1/2019 | Byfield | F28D 9/0062 | |
| 2020/0033070 A1 * | 1/2020 | Vlahinos | F01N 5/02 | |
| 2020/0300561 A1 * | 9/2020 | Walter | F28F 9/026 | |
| 2022/0120502 A1 * | 4/2022 | Herring | F28F 9/02 | |

FOREIGN PATENT DOCUMENTS

| | | | | |
|---|---|---|---|---|
| EP | 0203213 B1 * | 8/1988 | | |
| EP | 3225948 A1 * | 10/2017 | | F28F 21/08 |
| EP | 3339792 A1 * | 6/2018 | | B33Y 80/00 |
| FR | 3099562 A1 * | 2/2021 | | B22F 5/10 |
| JP | 2018527546 A * | 9/2018 | | |
| WO | WO 2017/165921 | 10/2017 | | |
| WO | WO-2017167747 A1 * | 10/2017 | | F28F 21/08 |
| WO | WO-2019171077 A1 * | 9/2019 | | B33Y 80/00 |

* cited by examiner

INTERNAL HEAT EXCHANGER FOR A VEHICULAR AIR CONDITIONING SYSTEM

CROSS-REFERENCE TO RELATED APPLICATIONS

This patent application is a continuation of International Patent Application No. PCT/IB2019/059365, filed on Oct. 31, 2019, which claims priority from Italian patent application no. 102018000010006 filed on Nov. 2, 2018, all of which are incorporated herein by reference, as if expressly set forth in their respective entireties herein.

TECHNICAL FIELD

The present invention relates to an internal heat exchanger, IHX, more particularly to an internal heat exchanger for the conditioning circuit of a vehicle.

BACKGROUND ART

The presence of an air conditioning system for the passenger compartments of road vehicles is nowadays common. Said air conditioning systems require a specialized circuit comprising known elements such as the compressor, the condenser, the expansion valve, the evaporator, any additional heat exchangers and the respective connection conduits.

Hybrid vehicles require greater performances from current air conditioning systems as they are particularly energy-intensive. It is therefore necessary to increase the efficiency of current air conditioning systems.

Said requirement is obviously felt even for traditional vehicles in order to reduce fuel consumption due to the conditioning system, also in order to reduce pollutant emissions.

Examples of known IHX are disclosed in documents WO2017165921 A1 and DE102012017404 A1.

WO2017165921 A1 relates to a general heat exchanger, i.e. not specifically voted to be used in vehicle, aimed to transfer as much heat as possible from one fluid to another fluid in as little space as possible, with as low a pressure drop (i.e. pumping loss) as possible.

In particular, it discloses a heat exchanger that has a plurality of sets of fluid channels each fluid channel having first and second end portions and an intermediate portion between the first and second end portions. The intermediate portions of the channels define specific paths that cross each over, thereby improving the heat exchange in a compact space.

DE102012017404 A1 relates to an IHX for an air conditioning system of a vehicle. In particular, it is voted to determine an optimal geometry for improving heat exchange and efficiency of IHX.

Such IHX comprises an inner tube and an outer tube, which partially encloses the inner tube by forming an intermediate space through which a heat exchange medium is flowed. The inner tube is designed as a multi-channel tube with multiple mutually parallel flow channels. The inner tube has a rectangular cross section with a certain width to height ratio. The flow channels are arranged side by side in a width direction of the inner tube.

a. The above cited documents however do not address the aims felt by new generation vehicles. Indeed their manufacturing process is costly and they have a low value of the ration between the area of heat exchange with respect to the volume of fluid flowing in the heat exchanger.

b. Accordingly, the need is still felt to improve the efficiency of the air conditioning system, for example by improving the heat exchangers, by maintaining or, if possible, increasing performances of the same without increasing their overall dimensions.

DISCLOSURE OF INVENTION

The object of the present invention is to solve the technical problems described above.

The aforementioned object is achieved by an internal heat exchanger for an air conditioning system of a road vehicle according to the attached claims.

BRIEF DESCRIPTION OF THE DRAWINGS

For a better understanding of the present invention a preferred embodiment is described in the following, by way of non-limiting example and with reference to the attached drawings wherein.

BEST MODE FOR CARRYING OUT THE INVENTION

Figure 1:
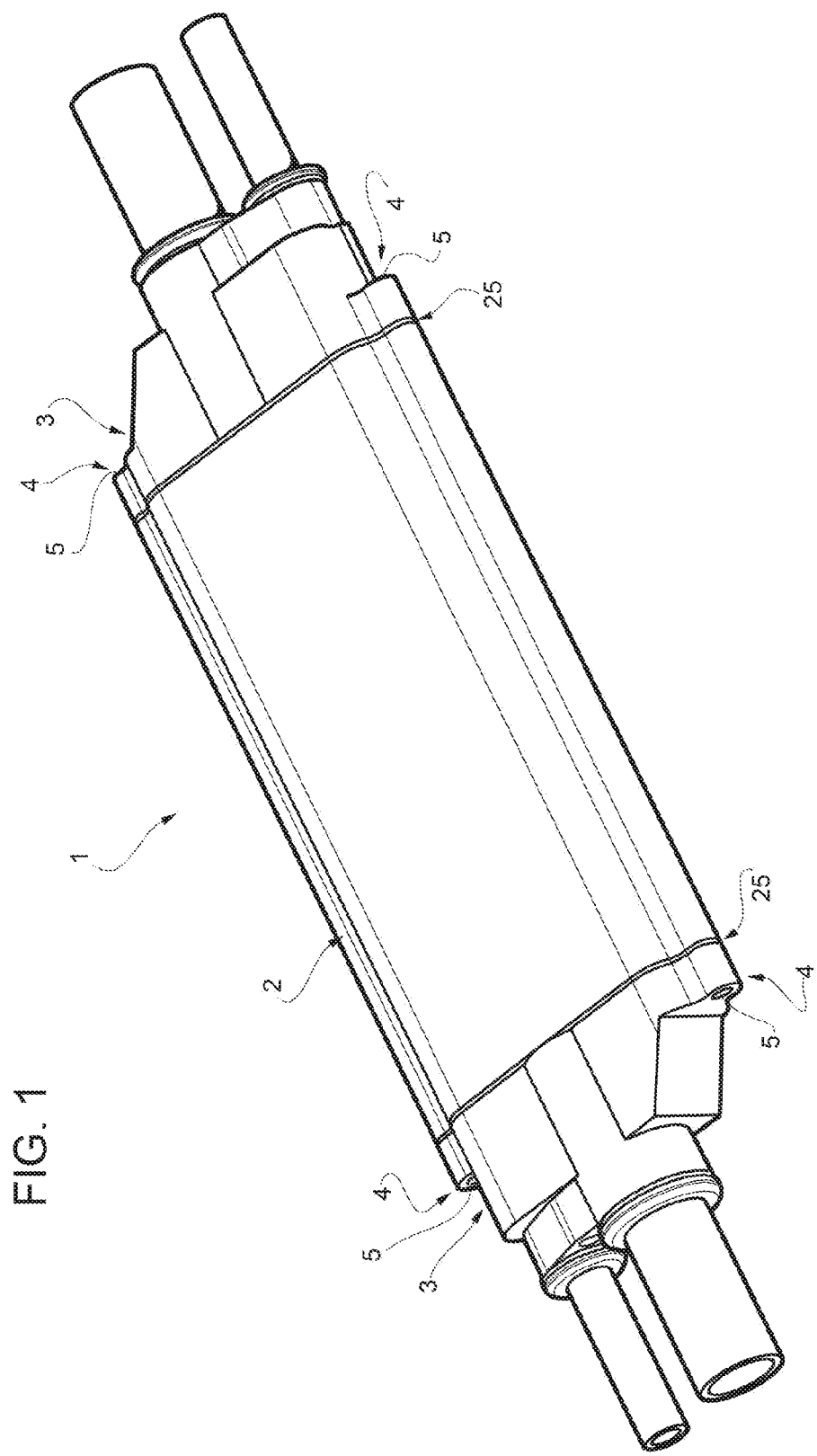
FIG. 1 is a perspective view of an internal heat exchanger according to the present invention.
Figure 2:
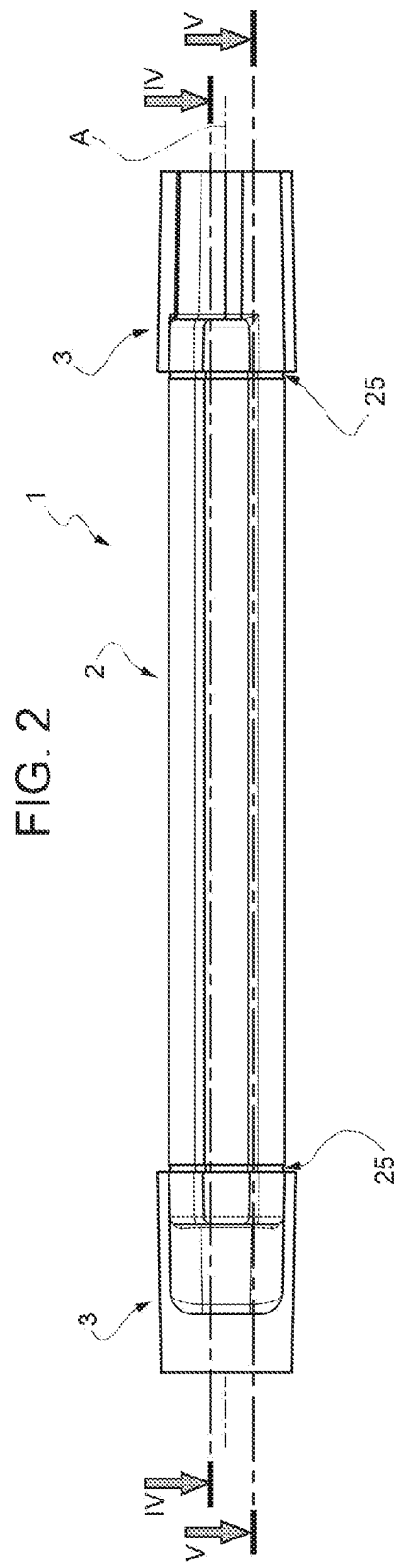
FIG. 2 is a side view of the exchanger of FIG. 1.
Figure 3:
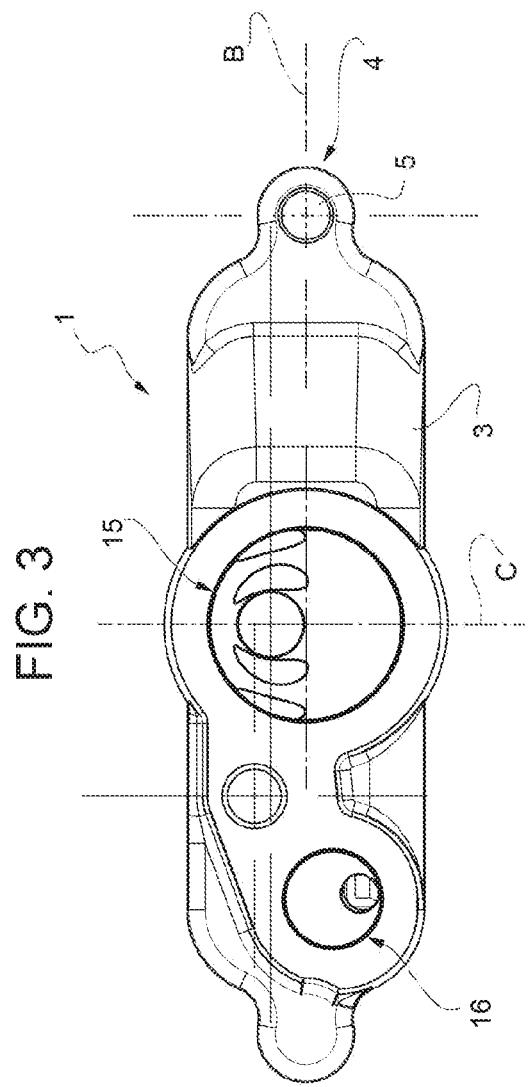
FIG. 3 is a front view of the exchanger of FIG. 1.

In FIG. 1 an internal heat exchanger (known in English as "IHX" Internal Heat Exchanger) is illustrated, denoted by the reference number 1, for an air conditioning circuit of a road vehicle.

The internal heat exchanger 1 essentially comprises an intermediate portion 2 and a pair of end portions 3, advantageously formed separately one from the other and made of a metal material and preferably made of aluminium, even more preferably an aluminium alloy of the 6000 family. Optionally the end portions 3 could be made of any material, for example a polymer.

The intermediate portion 2 extends along a longitudinal axis A and incorporates a substantially flat section, while each of the end portions 3 comprise a connecting portion having a complementary shape at one end of the intermediate portion 2, as better described in the following. In example embodiments, intermediate portion 2 can be prismatic in shape or an elliptic cylinder.

In particular, in the coupling area with the intermediate portion 2, each of the end portions 3 have an identical shape with respect to the intermediate portion 2. Advantageously between the end portions 3 and the intermediate portion 2 connecting means 4 are provided between each of the end portions 3 and the intermediate portion 2, not illustrated.

Preferably, said connecting means 4 comprise a mechanical coupling made, for example, by means of a threaded element (not shown) configured to cooperate inside a hole 5 made coaxially in each of the end portions 3 and the intermediate portion 2.

The intermediate portion 2 is a solid body having a substantially flat shape, advantageously of the rectangular-section plate type. Preferably the intermediate portion 2 has a length along the axis A of less than 250 mm, in particular between 100 and 180 mm, a width, i.e. an extension along a transverse axis B perpendicular to the axis A, of less than 100 mm, in particular between 50 and 90 mm and a thickness of less than 30 mm, in particular comprised between 18 and 25 mm. In the described embodiment the intermediate portion 2 has a length of 150 mm, a thickness of 22 mm and a width of 84.5 mm.

Figure 4:
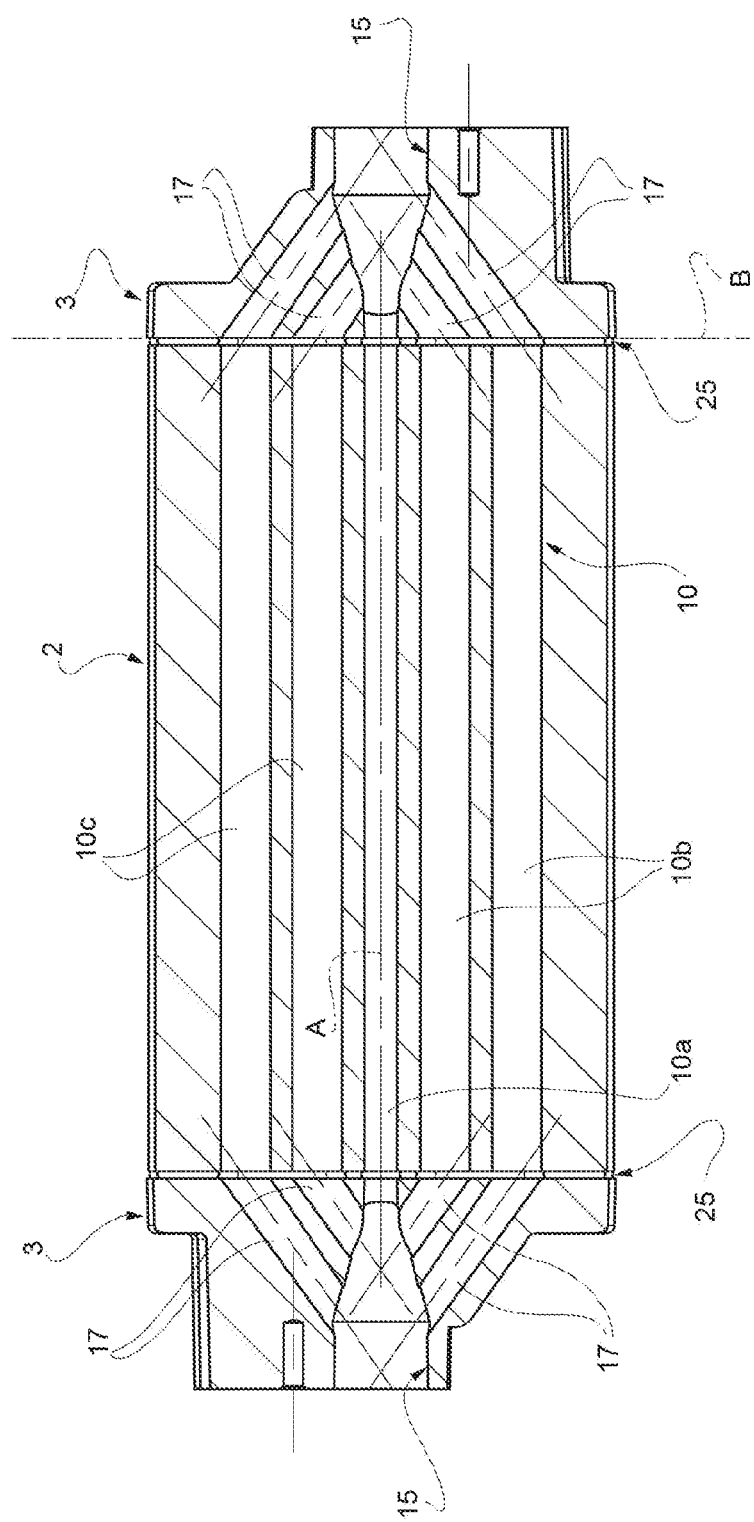
FIG. 4 is a section view along the axis IV-IV of FIG. 2.

The intermediate portion 2 further comprises a first plurality of conduits 10 made inside the intermediate portion 2. Preferably (FIG. 4) the conduits 10 have a curved section, preferably substantially circular and arranged in an aligned and parallel manner with one another along an axis parallel to the axis B.

The conduits 10 are in a number comprised between three and ten, preferably in a number of five in the case described, specifically a central conduit 10a, a pair of right conduits 10b and a pair of left conduits 10c. Advantageously, the diameter of the conduits 10 varies from conduit to duct; in particular, the diameter of the central conduit 10a is smaller than the diameter of the right and left conduits 10b, 10c. Preferably, moreover, the right and left conduits 10b, 10c have a substantially elliptical shape while the central conduit 10a has a substantially circular shape.

Advantageously, the diameter of the conduits 10 can vary from conduit to conduit and, advantageously in the case described, the diameter of the central conduit 10a is comprised between 5 and 8 mm, preferably 6 mm, while the axes defining the ellipses of the right and left conduits 10b, 10c are comprised between 6 and 10 mm, preferably 9 mm for the major axes and 7.4 mm for the minor axes.

Advantageously, the conduits 10 are equidistant along the axis B, in particular the centres are at a distance from one another comprised between 9 and 15 mm, preferably 13 mm between the ellipticals and 11.6 mm between the ellipticals and the central conduit 10a.

According to the present invention, a fluid, for example gaseous as described in the following, flowing in the conduits 10 can act on a surface comprised between 12000 and 40000 mm$^2$, preferably on a surface comprised between 18000 and 30000 mm$^2$, so that the ratio between the surface on which the aforementioned fluid acts and its volume is comprised between 0.5 and 0.8 mm$^{-1}$.

Figure 5:
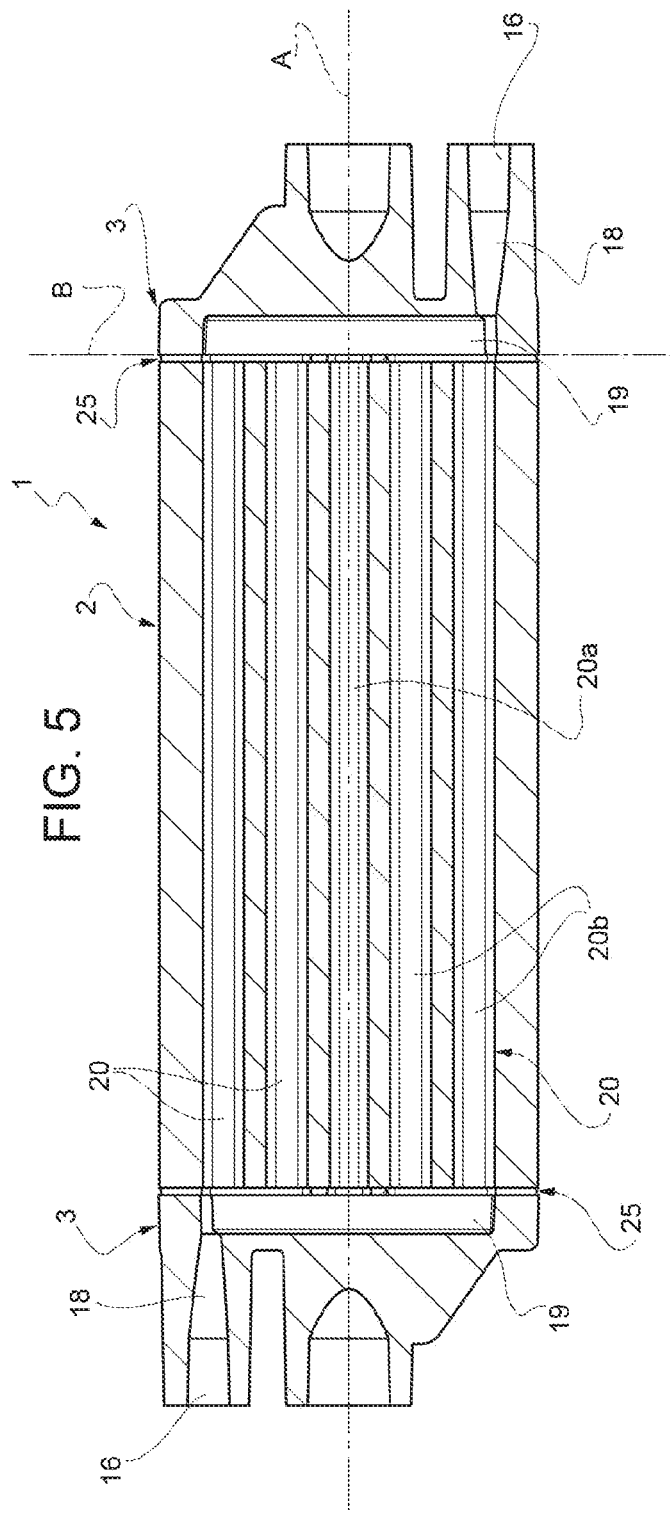
FIG. 5 is a section view along the axis V-V of FIG. 2.

The intermediate portion 2 further comprises a second plurality of conduits 20 made inside the intermediate portion 2. Preferably (FIG. 5) the conduits 20 are substantially rectangular in section, aligned with one another along an axis parallel to the axis B. In particular the conduits 20 are beside one another, having the respective shorter sides of the rectangular section adjacent to one another.

Preferably the substantially rectangular section is defined by a pair of larger sides, straight and parallel to one another and a pair of shorter semi-circumferential sides, of radius 1.75 mm, connecting the aforementioned longer sides to one another.

The conduits 20 are in a number comprised between one and five, preferably in a number of five in the case described, specifically a central conduit 20a, a pair of right conduits 20b and a pair of left conduits 20c. Optionally the length of the conduits 20 can vary from conduit to duct; in particular, the length along the axis B of the longer sides of the section of the central conduit 20a is smaller than the diameter of the right and left conduits 20b, 20c.

Advantageously, the length of the central conduit 20a is comprised between 6 and 16 mm, preferably 7 mm, while the length of the right and left conduits 10b, 10c is comprised between 6 and 16 mm, preferably 7.5 mm.

Advantageously, the conduits 20 are equidistant along the axis B, in particular at a distance from one another comprised between 2 and 6 mm, preferably 4 mm.

With reference for convenience to the element of FIG. 6, described in the following, it is clearly visible that, advantageously, the second plurality of conduits 20 is arranged, along a vertical axis C, arranged below relative to the first plurality of conduits 10 and at least the central conduits 10a, 20a of the respective plurality of conduits 10, 20 are coaxial to one another along said vertical axis C.

Preferably the first and second plurality of conduits 10, 20 are parallel to one another and each conduit 10 is arranged at a minimal distance of at least 3 mm along the axis C relative to a respective conduit 20.

According to the present invention each of the end portions 3 comprise a first opening 15 and a second opening 16 fluidically connected to the first and second plurality of conduits 10, 20, respectively.

The first opening 15 is fluidically connected to each conduit 10 by means of respective conduits 17 formed in the end portions 3 and joining in the opening 15. In the embodiment described, five conduits 17 will therefore be provided joining each conduit 10 to the opening 16.

The opening 16 is instead fluidically connected to the conduits 20 by means of an individual conduit 18 formed in the end portions 3. Advantageously a chamber 19 is formed between each of the end portions 3 and the intermediate portion 2, which is fluidically connected to each conduit 20 on one side and to the conduit 18 on the other.

Advantageously, the opening 15 is formed coaxially to the axis A of the internal heat exchanger 1 while the opening 16 is formed coaxially to an axis parallel to the axis A and spaced from the latter. The openings 15, 16 are configured so as to allow the insertion of respective delivery/return conduits (not shown) of conditioning fluids configured to flow inside the heat exchanger 1.

The internal heat exchanger 1 further comprises sealing means 25 interposed between each end portion 3 and the intermediate portion 2 and configured to prevent leakage of fluid between the chamber 19 and the plurality of conduits 20 or between the conduits 17 and the respective conduits 10.

In particular, said sealing means 25 comprise a single gasket 26 (FIG. 6) made of a polymer material having a flat shape substantially corresponding to the section of the portion 2 and axially interposed, by compression, between the intermediate portion 2 and the end portions 3. In particular the thickness of the single gasket 26 is uniform and less than 3 mm, preferably comprised between 0.8 and 1.5 mm.

Figure 6:
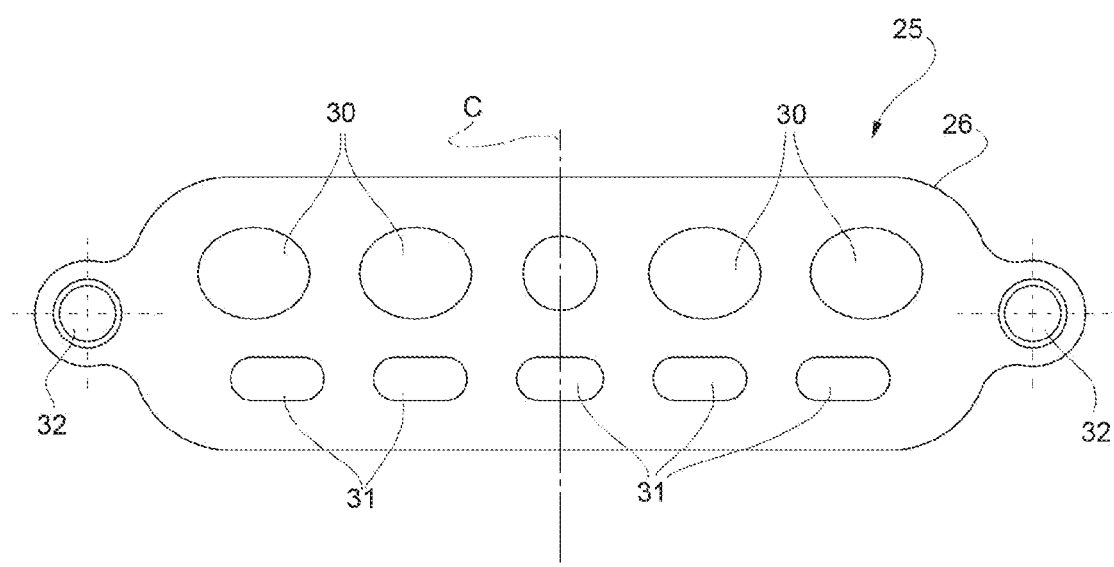
FIG. 6 is a plan view of an element of the heat exchanger according to the invention.

According to a first embodiment, FIG. 6, the gasket 26 comprises a first plurality of holes 30 having a shape and position corresponding to the shape and position of the openings of the plurality of conduits 10 and a second plurality of holes 31 having a shape and position corresponding to the shape and position of the openings of the plurality of conduits 20. The gasket 26 can also comprise a further pair of holes 32 configured to allow the passage of the pin 5 for fixing the end portions 3 and the intermediate portion 2.

Figure 7:
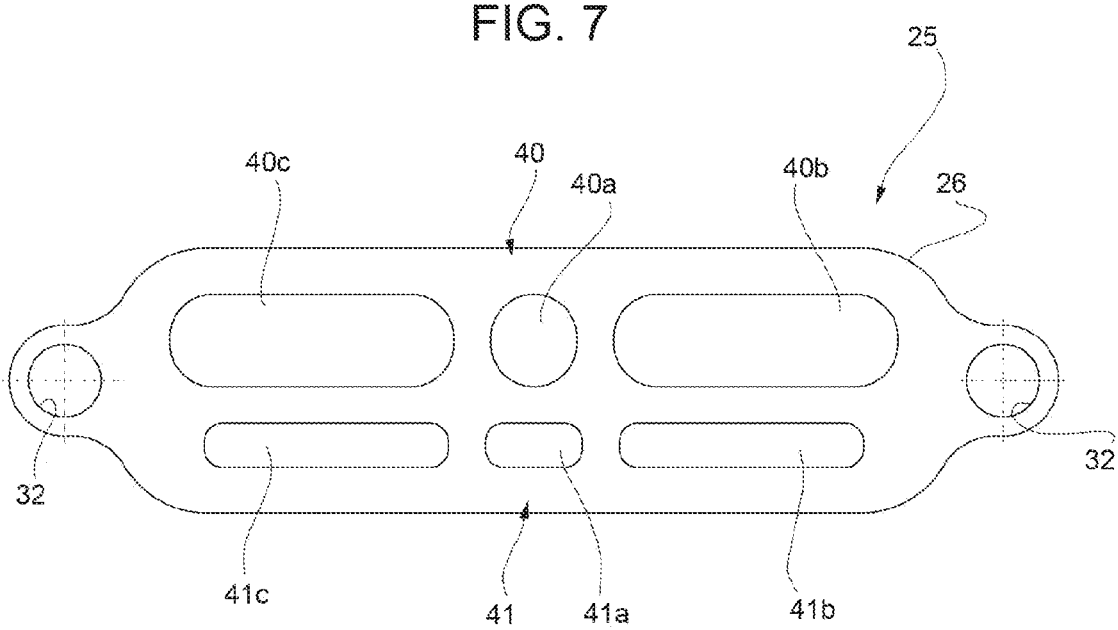
FIG. 7 is a plan view of an alternative embodiment of the element of FIG. 6.
Figure 8:
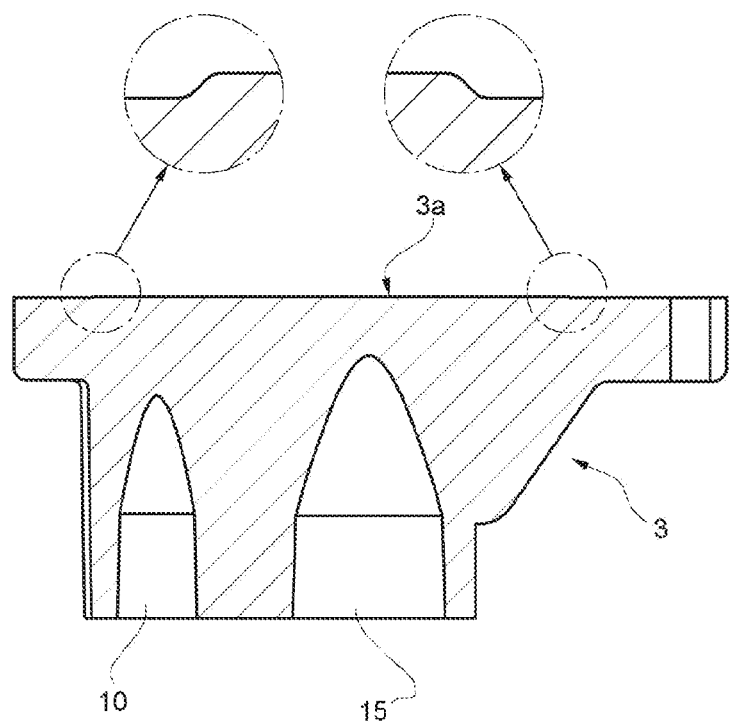
FIG. 8 is a transversal section view of a part of the heat exchanger according to the invention.

According to a first embodiment, FIG. 7, the gasket 26 can be made of a metal material coated with a layer of a polymer material and comprise a first plurality of holes 40 and a second plurality of holes 41 in a smaller number than the number of conduits formed in the intermediate portion 2.

In the case described, the first plurality of holes 40 comprises a central hole 40a, corresponding in shape to the central conduit 10a and a pair of side holes 40b having a substantially rectangular shape with a length such as to individually cover the right and left conduits 10b, 10c, respectively. Similarly, the second plurality of holes 41 comprises a central hole 41a, having a shape corresponding to the central conduit 20a and a pair of side holes 41b having a substantially rectangular shape with a length such as to individually cover the right and left conduits 20b, 20c, respectively.

As in the previous embodiment, the gasket 26 can also comprise a further pair of holes 32 configured to allow the passage of the threaded element passing through holes 5 for fixing the end portions 3 and the intermediate portion 2.

According to a preferred embodiment of end portions 3, an axial face 3a which is in direct contact with sealing means 25 has a shape that is not planar.

In particular, the shape has a higher extension along axis A in a central portion of the axial face 3a with respect to its edge.

The operation of the internal heat exchanger 1 is as follows.

In a typical operating configuration, inside the conduits 10, a first fluid flows, in a gaseous state, through the first opening 15 and the conduits 17, whereas inside the conduits 20, a second fluid flows, in a liquid state, having a higher temperature than the fluid in a gaseous state flowing in the conduits 10, through the second opening 16, the conduit 18 and the chamber 19. Preferably the two fluids flow counter-current with respect to one another.

Thanks to the fact that the exchange area between the conduits 20 and the conduits 10 is particularly high with respect to the volume of fluid that flows through the conduits 10, an effective heat exchange is guaranteed between the two fluids flowing inside the internal heat exchanger 1.

From the foregoing, the advantages of an internal heat exchanger according to the invention are evident.

The internal heat exchanger 1 is particularly efficient, ensuring a high heat exchange between the fluids flowing therein, while still maintaining particularly compact dimensions.

Moreover, the ratio between the area of heat exchange with respect to the volume of fluid flowing in the heat exchanger is equal, if not higher, to that of existing heat exchangers but with large dimensions, while the heat exchanger of the present invention is of smaller size, as mentioned, with a length of less than 250 mm and a thickness of less than 30 mm.

The particular shape of the conduits 10, 20 and their positioning also helps the aforementioned heat exchange.

The construction of the internal heat exchanger 1 is furthermore particularly simple and inexpensive, in fact the intermediate portion 2 can be made by extrusion and the end portions 3 can be made by molding/casting and assembled successively to the intermediate portion 2.

Furthermore, the use of sealing means 25 comprising a single gasket 26 allows to obtain an excellent fluid-tight seal in an inexpensive and simple way.

Thanks to the peculiar non-planar shape of axial face of an end portion 3, the axial load between this latter and the intermediate portion 2 is substantially constant. Indeed, the difference of height compensate the concentrated load imparted by threaded means in holes 5. Therefore, the tight of sealing means 25 is considerably improved.

Finally, it is clear that modifications and variations can be made to the internal heat exchanger 1 according to the present invention, which however do not depart from the scope defined by the claims.

For example, the number of conduits 10 or their diameter can vary within the limits described or, similarly, the shape of the conduits 20 could be different, being dependent on the number and diameter of the conduits 10.

Furthermore, the end portions 3 can be made in one piece with the intermediate portion, for example by 3D molding.

Furthermore, the sealing means 25 or the same fixing of the end portions 3 to the intermediate portion 2 could be made in different ways.

The invention claimed is:

1. An internal heat exchanger for an air conditioning system of a vehicle comprising:
   an intermediate portion; and
   two end portions,
   wherein each of said two end portions comprises a first opening for a first passage of a first conditioning fluid inside said internal heat exchanger and a second opening for a second passage of a second conditioning fluid inside said internal heat exchanger,
   wherein said intermediate portion comprises a thermal-conductive block extending along a longitudinal axis and is provided with a first plurality of conduits fluidically connected to said first openings and a second plurality of conduits fluidically connected to said second openings for the respective first and second passages of said first and second conditioning fluids,
   wherein each of said first plurality of conduits and said second plurality of conduits extend between said two end portions parallel to said longitudinal axis,
   wherein at least a portion of said first and second passages of said first and second openings are parallel to said longitudinal axis,
   wherein said each first opening is fluidically connected to each of said first plurality of conduits via a respective first connecting conduit,
   wherein said each second opening is fluidically connected to said second plurality of conduits via a singular second connecting conduit, and
   wherein each said respective first connecting conduit and each said singular second connecting conduit are formed in respective ones of said two end portions.

2. The internal heat exchanger according to claim 1, wherein said first connecting conduits have respective incident axes.

3. The internal heat exchanger according to claim 1, wherein said first plurality of conduits comprise between three and ten of said first plurality of conduits and said second plurality of conduits comprise between two and five of said second plurality of conduits.

4. The internal heat exchanger according to claim 1, wherein said first plurality of conduits each have a circular cross-section.

5. The internal heat exchanger according to claim 4, wherein a diameter of said circular cross-section is comprised between 9 and 5 mm.

6. The internal heat exchanger according to claim 1, wherein said second plurality of conduits each have a substantially rectangular cross-section.

7. The internal heat exchanger according to claim 1, wherein a minimal distance between said first and second plurality of conduits is at least 3 mm.

8. The internal heat exchanger according to claim 1, wherein an area wetted by one of said first and second conditioning fluids is between 12000 and 40000 mm$^2$.

9. The internal heat exchanger according to claim 1, wherein a ratio between an area wetted by one of said first and second conditioning fluids and a flow volume in a corresponding one of said first and second plurality of conduits is between 0.5 and 0.8 mm$^{-1}$.

10. The internal heat exchanger according to claim 1, wherein said thermal-conductive block has a substantially rectangular cross section.

11. The internal heat exchanger according to claim 1, further comprising a gasket adapted to prevent leakage of fluid between said intermediate portion and at least one of said two end portions, said mask being axially interposed between said intermediate portion and said at least one end portion.

12. The internal heat exchanger according to claim 11, wherein the gasket between said at least one end portion and said intermediate portion defines a non-planar axial face having an uneven surface.

13. The internal heat exchanger according to claim 12, wherein
said axial face has a central portion and an edge portion, and
a height of said central portion is greater than a height of said edge portion.

* * * * *